United States Patent
Staroselsky et al.

(10) Patent No.: US 10,527,011 B2
(45) Date of Patent: Jan. 7, 2020

(54) SONICATION-ASSISTED FUEL DEOXYGENATION

(71) Applicant: Hamilton Sundstrand Corporation, Charlotte, NC (US)

(72) Inventors: Alexander Staroselsky, Avon, CT (US); Haralambos Cordatos, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 291 days.

(21) Appl. No.: 15/614,719

(22) Filed: Jun. 6, 2017

(65) Prior Publication Data
US 2018/0347517 A1 Dec. 6, 2018

(51) Int. Cl.
| | |
|---|---|
| *B01D 53/22* | (2006.01) |
| *F02M 27/08* | (2006.01) |
| *F23K 5/08* | (2006.01) |
| *B01J 19/10* | (2006.01) |
| *B01D 19/00* | (2006.01) |

(52) U.S. Cl.
CPC ......... *F02M 27/08* (2013.01); *B01D 19/0031* (2013.01); *B01D 19/0094* (2013.01); *B01J 19/10* (2013.01); *F23K 5/08* (2013.01); *F23K 2900/05082* (2013.01); *F23N 2041/20* (2013.01)

(58) Field of Classification Search
CPC ............ B01D 19/0094; B01D 19/0078; B01D 19/0031; F23K 2900/05082; F23K 5/08; F02M 27/08; F02C 7/22; B01J 19/10
See application file for complete search history.

(56) References Cited

U.S. PATENT DOCUMENTS

| | | | | |
|---|---|---|---|---|
| 3,052,527 A | * | 9/1962 | Andrus | B01D 19/0031 210/750 |
| 3,464,861 A | * | 9/1969 | Smith | H01M 8/1231 429/482 |
| 7,041,154 B2 | | 5/2006 | Staroselsky et al. | |
| 9,296,485 B2 | | 3/2016 | Haskins et al. | |
| 2004/0060436 A1 | * | 4/2004 | Parekh | B01D 19/0031 95/46 |
| 2005/0126391 A1 | * | 6/2005 | Staroselsky | B01D 19/0031 95/30 |
| 2005/0230856 A1 | * | 10/2005 | Parekh | B01D 19/0031 261/122.1 |
| 2007/0163438 A1 | * | 7/2007 | Chiappetta | B01D 19/0031 96/6 |

(Continued)

FOREIGN PATENT DOCUMENTS

| | | |
|---|---|---|
| EP | 1541227 A2 | 6/2005 |
| EP | 1920810 A2 | 5/2008 |
| EP | 2713027 A2 | 4/2014 |

OTHER PUBLICATIONS

European Search Report for EP Application No. 18176251.9 dated Oct. 31, 2018.

*Primary Examiner* — Anthony R Shumate
(74) *Attorney, Agent, or Firm* — Carlson, Gaskey & Olds, P.C.

(57) ABSTRACT

A fuel deoxygenation system has a deoxygenator, an ultrasound transducer, and a control. The ultrasonic transducer is operable to direct ultrasonic waves into a flow passage for a fuel connected to the deoxygenator. A gas turbine engine and a method are also disclosed.

17 Claims, 1 Drawing Sheet

(56) References Cited

U.S. PATENT DOCUMENTS

| | | | | |
|---|---|---|---|---|
| 2008/0110144 | A1* | 5/2008 | Mordkovich | B01D 53/228 55/385.1 |
| 2009/0303432 | A1* | 12/2009 | Suzuki | B29D 11/00125 351/159.02 |
| 2010/0086907 | A1* | 4/2010 | Bunegin | A01N 1/0247 435/1.1 |
| 2011/0212431 | A1* | 9/2011 | Bunegin | A01N 1/0247 435/1.2 |
| 2012/0122138 | A1* | 5/2012 | Randles | C12M 23/14 435/29 |
| 2013/0004937 | A1* | 1/2013 | Yoshida | A61M 1/0209 435/2 |
| 2014/0059978 | A1* | 3/2014 | Bolejack | B65B 25/001 53/428 |
| 2014/0129251 | A1* | 5/2014 | Matsuba | G06Q 30/0601 705/2 |
| 2014/0230446 | A1* | 8/2014 | Beutel | F01N 3/0864 60/773 |
| 2015/0133339 | A1* | 5/2015 | Prindle | G01N 33/1866 506/10 |
| 2015/0260105 | A1* | 9/2015 | Nemitallah | F02C 7/22 60/780 |
| 2018/0290380 | A1* | 10/2018 | Rehrig | B29C 35/0805 |

* cited by examiner

SONICATION-ASSISTED FUEL DEOXYGENATION

BACKGROUND OF THE INVENTION

This application relates to a system which utilizes ultrasonic waves to create gas bubbles in a fuel flow.

Gas turbine engines are known and typically include a number of systems. As one example, a fuel supply system supplies fuel to a combustor. Typically, a fuel pump delivers the fuel from a fuel tank.

Inevitably, oxygen is mixed into the fuel. Transferring heat to fuel helps provide thermal control for valves, pumps, electronics, and gearboxes, among other ancillary hardware. As more heat is transferred to the fuel, temperatures rise, and dissolved oxygen combined with this high temperature result in fuel varnish/coke coating internal surfaces of fuel line components and nozzles, causing degraded performance and limited life. As such, it is known to attempt to remove the dissolved oxygen from the fuel prior to its use as a heat sink.

A number of systems have been developed. In one such system, a membrane is placed within a deoxygenator. When the oxygen contacts this membrane, it moves across the membrane and into a chamber from which it may then be removed.

However, there are challenges with such systems. In particular, the oxygen may be mixed rather homogenously within the fuel and it must be brought in contact with the membrane to be removed with such systems. It has been proposed to create bubbles of oxygen within the fuel using venturis and other systems.

In addition, it is known to create cavitation within the deoxygenator by utilizing sound waves. Sound generators are placed in the deoxygenator to create the cavitation and thus gas bubbles.

SUMMARY OF THE INVENTION

A fuel deoxygenation system has a deoxygenator, an ultrasound transducer, and a control. The ultrasonic transducer is operable to direct ultrasonic waves into a flow passage for a fuel connected to the deoxygenator.

A gas turbine engine and a method are also disclosed.

These and other features may be best understood from the following drawings and specification.

DETAILED DESCRIPTION

Figure 1:
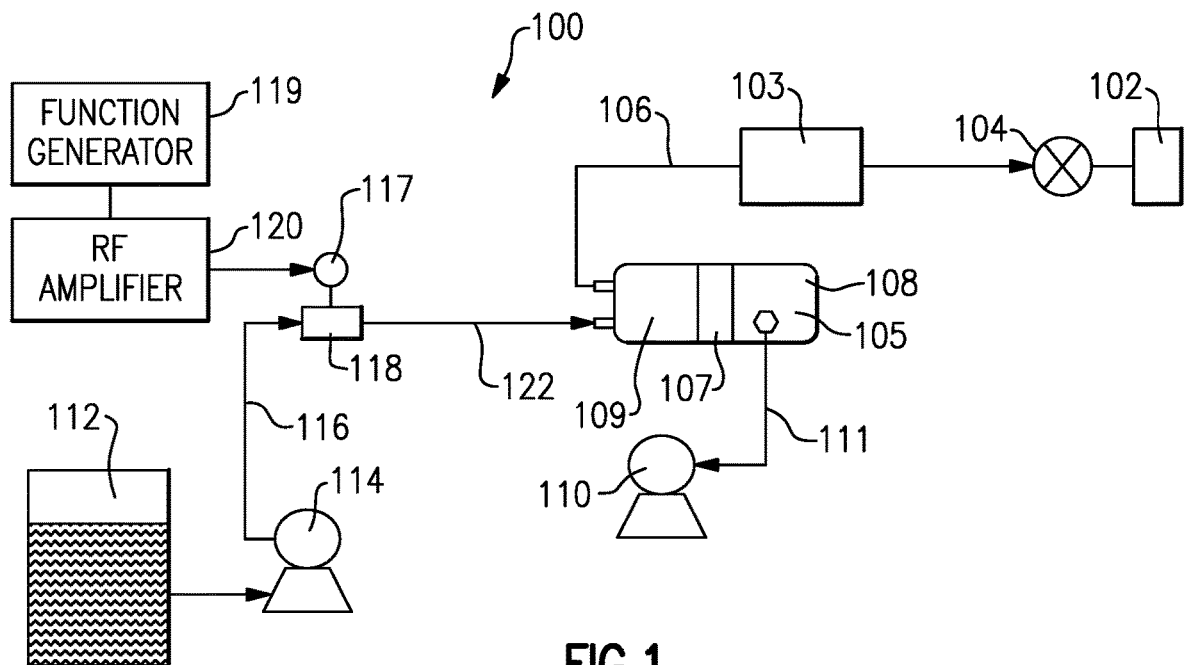
FIG. 1 shows a fuel supply system for a gas turbine engine.

A fuel supply system 100 is illustrated in FIG. 1 for a gas turbine engine 102. As known, a high pressure fuel pump 104 delivers fuel to a combustor on the engine 102. A supply line 106 supplies the fuel downstream of a deoxygenator 108. This deoxygenator is shown schematically. A second optional oxygen removal system 103 is included. The details of this disclosure may be utilized separately from any such second deoxygenator or may be utilized to supplement less efficient deoxygenators 103.

Deoxygenator 108 includes a membrane 107. As known, fuel enters a chamber 109 in the deoxygenator 108 and oxygen passes across the membrane into a chamber 105 from which it can be removed through a vent line 111 by a vacuum source 110. The operation of such systems is as known. However, as mentioned above, it is challenging to bring the majority of the oxygen in the fuel into contact with the membrane.

While a membrane type deoxygenator is specifically disclosed, it should be understood that this disclosure extends to other types of deoxygenator systems which must come in contact with the oxygen for removal. Catalytic systems are but one example of other types of deoxygenators which come within the scope of this disclosure.

Examples of fuel deoxyenators may be a spiral-wound type such as shown in U.S. Pat. No. 7,933,388, or a hollow-fiber type as shown in U.S. Pat. No. 5,902,747. These two devices each include membranes.

A fuel tank 112 communicates with a fuel pump 114 delivering fuel to a supply line 116 and into a flow portion 118. Flow portion 118 delivers the fuel downstream to line 122 and into the chamber 109 in the deoxygenator 108. The oxygen will be removed across the membrane 107.

The flow portion 118 is associated with a focused transducer 117 capable of generating ultrasonic waves within the fuel in the flow portion 118. An RF amplifier 120 and a function generator or control 119 also controls the transducer 117. When fuel passes through the flow portion 118, ultrasonic waves are generated into the fuel and bubbles are formed from trapped oxygen and other gases. It may be desirable to have the flow portion immediately upstream of the deoxygenator 108.

Such transducers are known and it is known that ultrasonic waves will form bubbles within a fluid that contains dissolved gas. The details of how such systems operate may be as known in the art. However, the application to the fuel system and the control details as disclosed below are novel to this disclosure.

Figure 2:
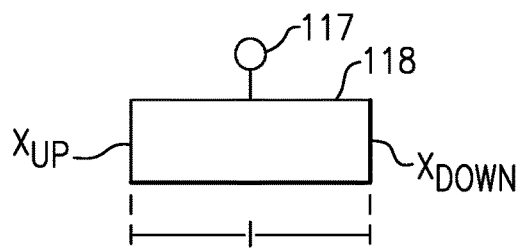
FIG. 2 shows a detail of one portion of the FIG. 1 system.

In particular, FIG. 2 shows a detail of the flow portion 118. It extends between an upstream end $X_{UP}$ to a downstream end $X_{DOWN}$, across a length l.

Applicant has recognized that it is undesirable to create cavitation within the fuel in such an application. Rather, it is more desirable to periodically induce the ultrasonic waves into the fuel thus causing the formation of bubbles, but short of causing actual cavitation.

For this reason, the function generator 119 and amplifier 120 are operable to cause bursts of ultrasonic waves into the fuel. As one example, a pulse of ultrasonic waves may occur for 10 to 20 seconds and would then be followed by a break before the next pulse.

The break may occur for less than or equal to 1 second.

The length of the pulse and the length of the break may be determined by the length of the flow portion 118. That is, it may be desirable to select the time for the pulses and the break as to apply the ultrasonic energy to all of the fuel between $X_{UP}$ and $X_{DOWN}$ and the break would then allow that quantity of fuel to leave the flow portion 118 and a new volume of fuel to replace it. It should be understood that the supply of fuel to the gas turbine engine is continuous during operation of the transducer 117 and thus the periodic bursts and breaks may be timed to ensure that a high percentage of the oxygen is removed while still not creating cavitation.

Figure 3:
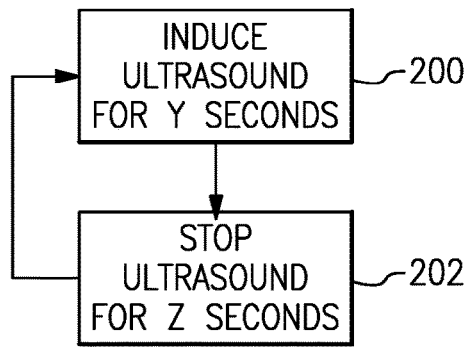
FIG. 3 is a brief flowchart.

FIG. 3 shows a brief flowchart. In a first step 200, ultrasonic waves are induced for Y seconds. In a second step, a break or a stoppage of ultrasonic waves occurs for Z seconds at step 202. The steps are repeated.

As can be appreciated, the bursts and breaks are timed to optimize oxygen removal.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A dissolved oxygen removal system comprising:
   a deoxygenator;
   an ultrasonic transducer and a control, said ultrasonic transducer being operable to direct ultrasonic waves into a flow passage for a fuel connected to said deoxygenator; and
   wherein the control for said ultrasonic transducer periodically creates bursts of said ultrasonic waves and then stops the ultrasonic waves for a break period.

2. The system as set forth in claim 1, wherein said deoxygenator includes a membrane that allows dissolved oxygen to pass for removal from the deoxygenator.

3. The system as set forth in claim 1, wherein the bursts of ultrasonic waves occur for between 10 and 20 seconds.

4. The system as set forth in claim 3, wherein the break occurs for less than or equal to 1 second.

5. The system as set forth in claim 4, wherein a fuel pump drives fuel through a portion of said flow passage associated with said transducer, and said bursts and said break periods are timed to optimize oxygen removal.

6. The system as set forth in claim 1, wherein a second oxygen removal system is positioned at a location where the fuel will be downstream of said deoxygenator.

7. A gas turbine engine fuel supply system comprising:
   a gas turbine engine and a fuel pump delivering fuel into a combustor on said gas turbine engine;
   a deoxygenator;
   an ultrasonic transducer and a control, said ultrasonic transducer being operable to direct ultrasonic waves into a flow passage for a fuel connected to said deoxygenator; and
   wherein the control for said ultrasonic transducer periodically creates bursts of said ultrasonic waves and then stops the ultrasonic waves for a break period.

8. The gas turbine engine fuel supply system as set forth in claim 7, wherein said deoxygenator includes a membrane that allows oxygen to pass for removal from the deoxygenator.

9. The gas turbine engine fuel supply system as set forth in claim 7, wherein the bursts of ultrasonic waves occur for between 10 and 20 seconds.

10. The gas turbine engine fuel supply system as set forth in claim 9, wherein the break occurs for less than or equal to 1 second.

11. The gas turbine engine fuel supply system as set forth in claim 10, wherein the fuel pump drives fuel through a portion of said flow passage associated with said transducer, and said bursts and said break period are timed to optimize oxygen removal.

12. The gas turbine engine fuel supply system as set forth in claim 7, wherein a second oxygen removal system is positioned at a location where the fuel will be downstream of said deoxygenator.

13. A method of operating a gas turbine engine comprising the steps of:
   delivering fuel into a combustor on said gas turbine engine and through a deoxygenator;
   directing ultrasonic waves into a flow passage for the fuel connected to said deoxygenator; and
   wherein a control for an ultrasonic transducer periodically creates bursts of said ultrasonic waves and then stops the ultrasonic waves for a break period.

14. The method as set forth in claim 13, wherein said deoxygenator includes a membrane and oxygen passing across the membrane for removal from the deoxygenator.

15. The method as set forth in claim 13, wherein the bursts of ultrasonic waves occur for between 10 and 20 seconds.

16. The method as set forth in claim 15, wherein the break occurs for less than or equal to 1 second.

17. The method as set forth in claim 16, wherein a fuel pump drives fuel through a portion of the flow passage associated with said transducer, and said bursts and said break period are timed to optimize oxygen removal.

* * * * *